C. S. SHARP.
TANDEM HITCH FOR DISK HARROWS.
APPLICATION FILED MAY 21, 1917.
1,322,066.
Patented Nov. 18, 1919.
4 SHEETS—SHEET 1.
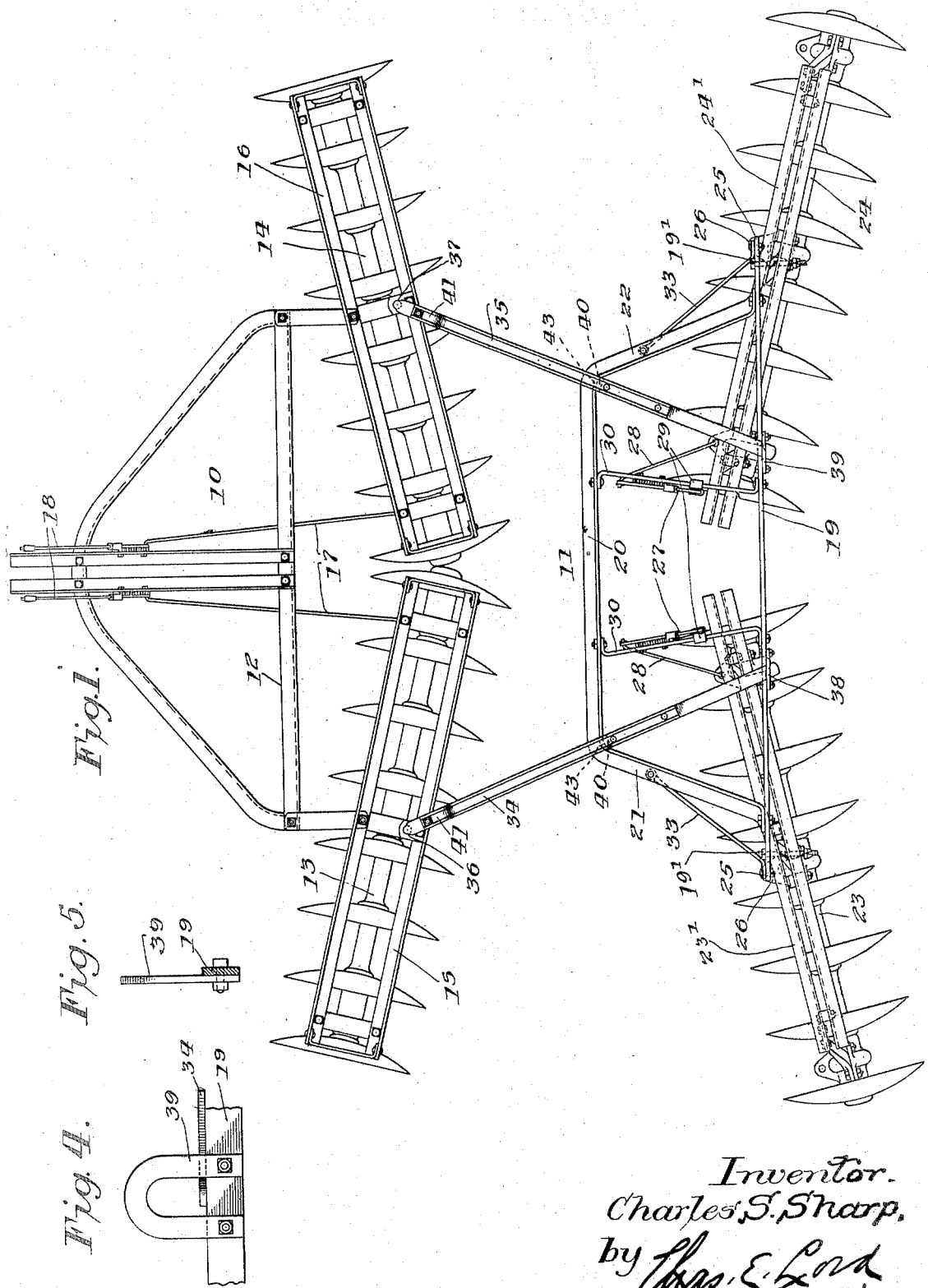
Inventor.
Charles S. Sharp,
by Chas. E. Lord
Atty.

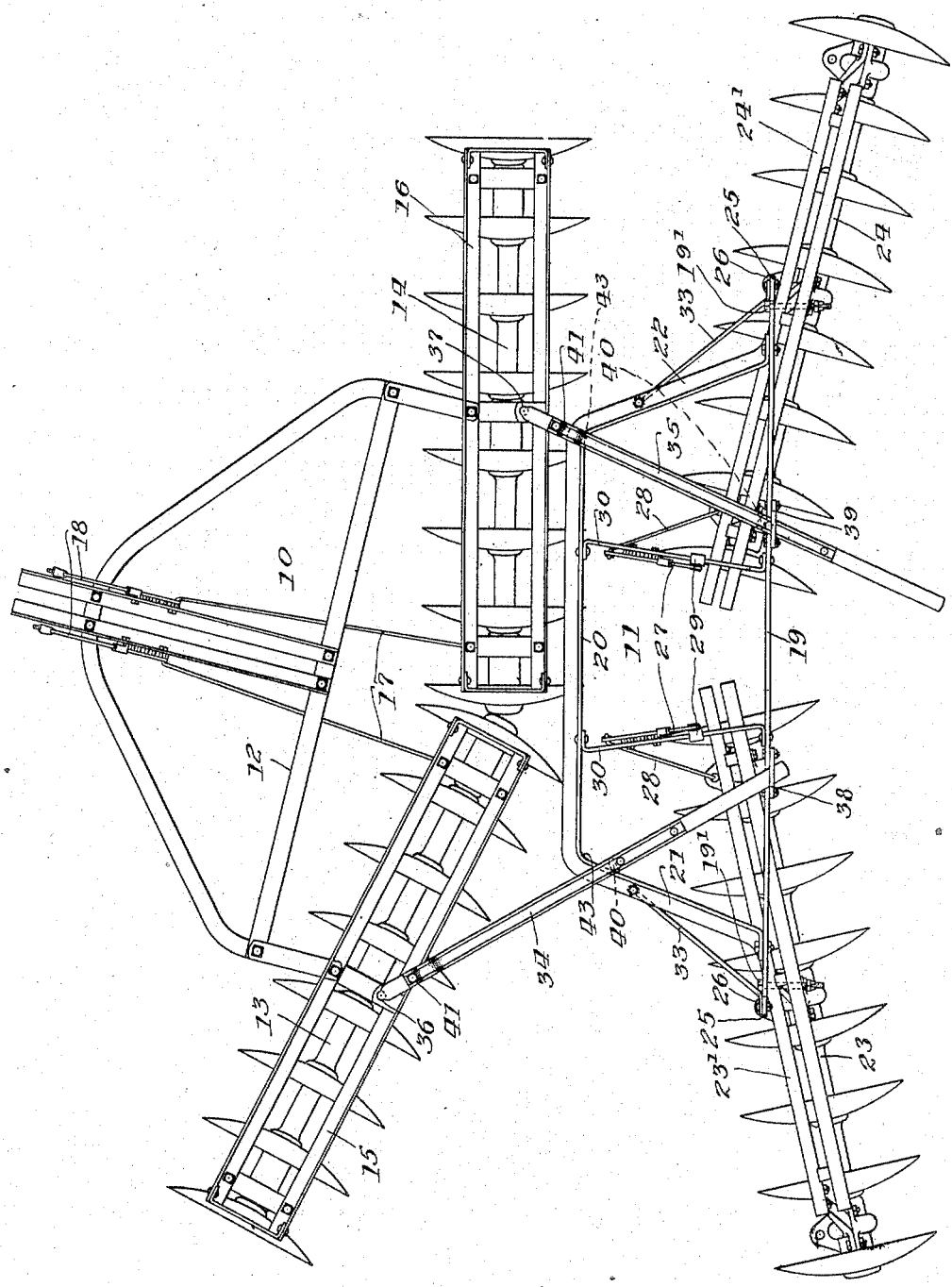

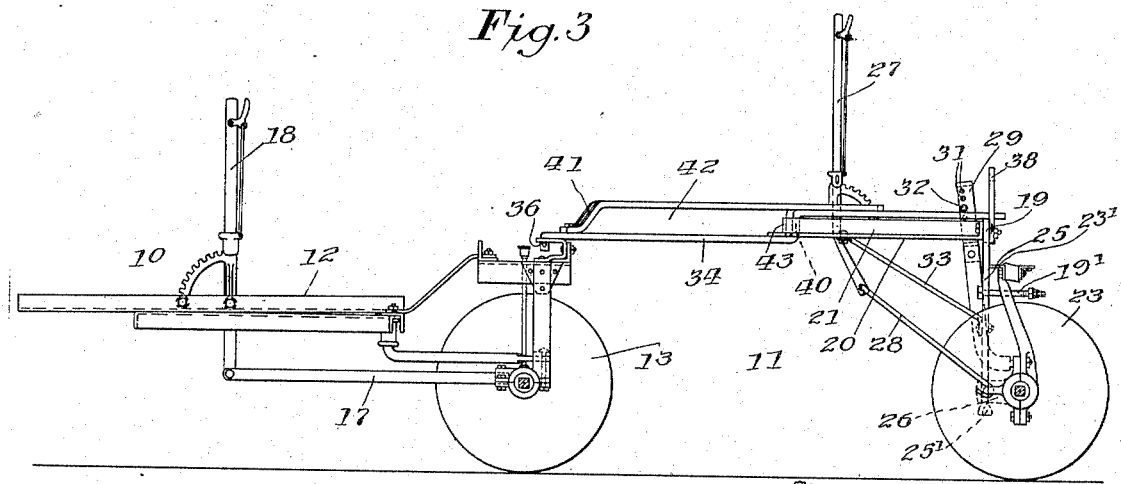
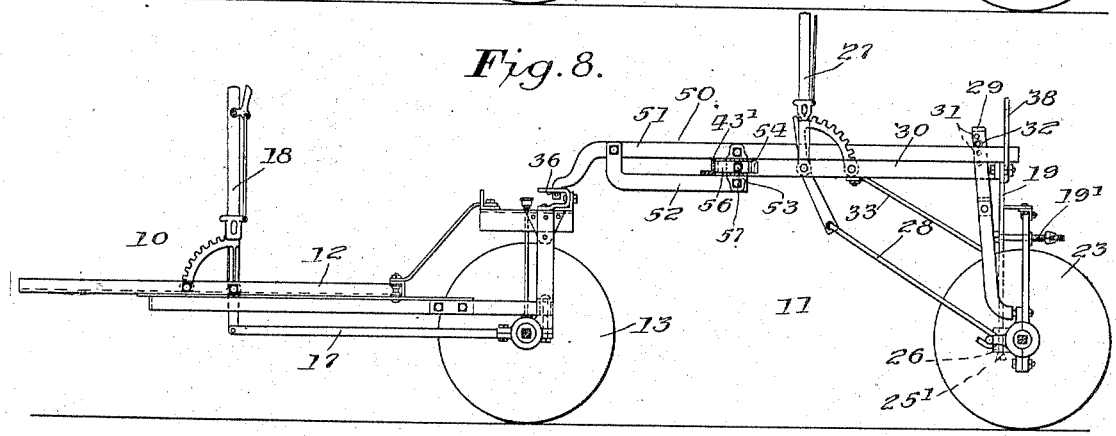
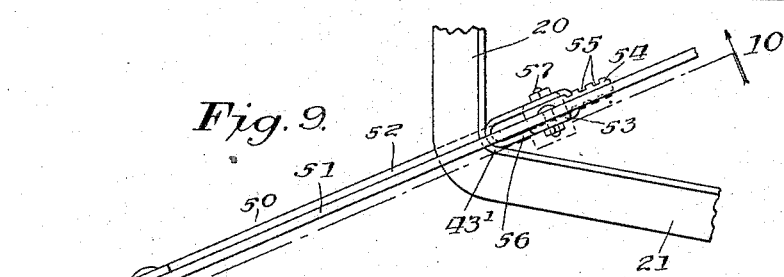
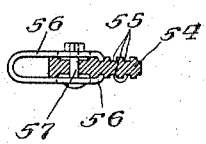
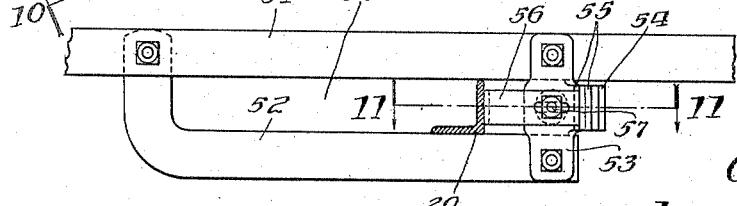

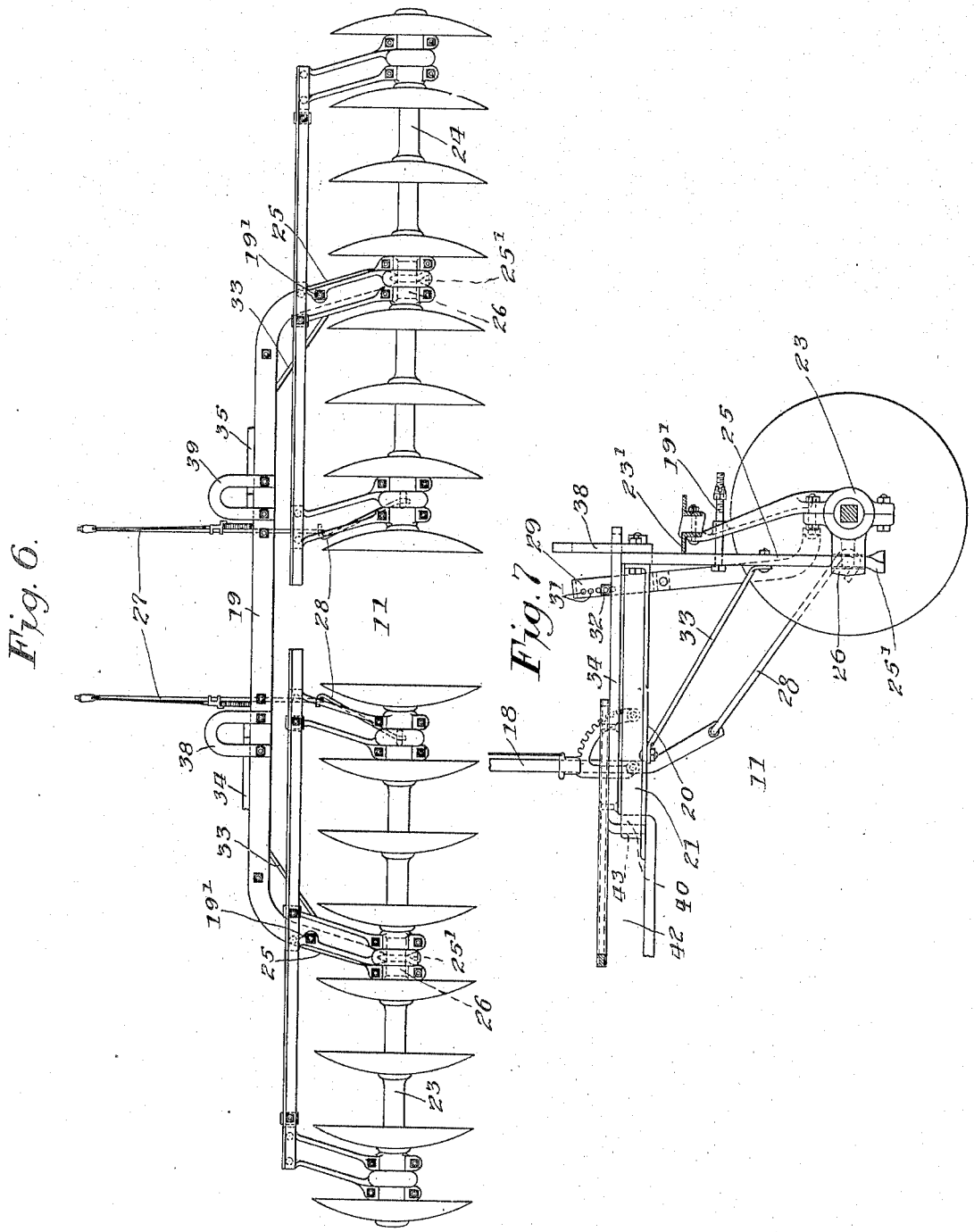

UNITED STATES PATENT OFFICE.

CHARLES S. SHARP, OF AUBURN, NEW YORK, ASSIGNOR, BY MESNE ASSIGNMENTS, TO INTERNATIONAL HARVESTER COMPANY, A CORPORATION OF NEW JERSEY.

TANDEM HITCH FOR DISK HARROWS.

1,322,066. Specification of Letters Patent. Patented Nov. 18, 1919.

Application filed May 21, 1917. Serial No. 170,048.

*To all whom it may concern:*

Be it known that I, CHARLES S. SHARP, a citizen of the United States, residing at Auburn, in the county of Cayuga and State of New York, have invented certain new and useful Improvements in Tandem Hitches for Disk Harrows, of which the following is a full, clear, and exact specification.

This invention relates to tandem hitches for ground treating units, and more particularly to tandem hitches for disk harrows.

Two essential requisites for proper operation of double disk harrows are that there shall be flexibility so that the harrow may be easily turned under good and adverse conditions and that there shall be proper trailing of the rear unit so that ridges of ground made by the front harrow unit may be leveled by the trailing harrow unit. Most of the double disk harrows in use today have one or the other of these requisites, but they do not have both of these requisites, or do not have the same to a desired degree.

It is, therefore, one object of my invention to connect two units in a manner such that there will be flexibility between the various parts, and also proper trailing relationship to accomplish the desired results.

A further object of my invention is to provide a simple, durable and efficient harrow which is adapted to meet all of the requirements for successful commercial operation.

These and other objects are accomplished by providing a harrow having front and rear units and novel rearwardly converging telescopically mounted connections between said units.

The invention is illustrated on the accompanying sheets of drawings, in which—

Figure 1 is a plan view of a double disk harrow embodying my invention;

Fig. 2 is a plan view of the same showing the relative positions which the front harrow unit and the rear harrow unit may assume in turning a sharp corner;

Fig. 3 is a partial side elevation with the disk gangs straightened up and showing one of the draft connections between the front and rear units;

Fig. 4 is a detail view showing one of the elongated loop members secured to the rear harrow frame, and through which one of the draft connections passes;

Fig. 5 is a fragmentary side elevation of the loop member and its support shown in Fig. 4;

Fig. 6 is a rear elevation of the rear unit of the tandem disk harrow;

Fig. 7 is a fragmentary side elevation of the rear unit of the same tandem disk harrow;

Fig. 8 is a partial side elevation of a tandem disk harrow showing a modification of the connection between the front and rear units, said connection including adjustable means for controlling the proper division of the load;

Fig. 9 is a fragmentary plan elevation of one of the draft connections, showing the adjustable means in engagement with one corner of the rear harrow frame;

Fig. 10 is a view taken in the plane of line 10—10 of Fig. 9; and,

Fig. 11 is a fragmentary detail sectional view of the adjustable means on the draft connections and taken in the plane of line 11—11 of Fig. 10.

The various novel features of my invention will be apparent from the following description and drawings and will be particularly pointed out in the appended claims.

The invention is shown in connection with a double disk harrow having a front unit 10 and a rear unit 11 which are flexibly connected in a manner to be considered in detail hereinafter. The front unit includes a frame 12, to which are pivotally connected two disk gangs 13 and 14 having frames 15 and 16, respectively. Connected to the inner ends of these disk gangs are links 17 which are connected to operating levers 18, whereby the angularity of the front disk gangs may be varied with respect to the line of draft.

The rear unit includes a frame having a rear transverse frame member 19 and a front transverse frame member 20, the ends of the latter of which are bent to diverge rearwardly, forming side frame portions 21 and 22 which are secured to the rear transverse frame member 19. There are two disk gangs 23 and 24 connected to the rear frame on vertical pivots formed by depending portions 25 of the extreme ends of the rear frame member 19 passing down through suitable eye members 26 on the gangs 23 and 24. The eye members have relatively large openings to loosely receive the lower twisted ends 25' of the depending portions 25 of rear frame member 19, thereby providing in effect a universal joint whereby each rear gang may swing bodily rearward and forward and in a vertical plane and in combinations of the same. The rear harrow gangs 23 and 24 are drawn forwardly through the pivotal connections at the eye members 26, which means that the forward cross frame bars 23' and 24' of the rear harrow gangs normally engage the depending portions 25 of the frame member 19. However, when the harrow is backed, the rear gangs swing bodily rearwardly about the pivotal connections at eye members 26, whereby frame bars 23' and 24' swing away from depending portions 25 of the rear frame member 19. To limit the rearward swinging movement, a bolt 19', provided with a limiting head and nut, loosely passes through openings in each of the frame depending portions 25 and central standard of each rear harrow gang. It is seen, therefore, that bodily swinging movement of the rear harrow gangs is limited. The angularity of the rear disk gangs 23 and 24 may be varied with respect to the line of draft by levers 27 which are connected to the inner portions of the disk gangs 23 and 24 by links 28. The inner ends of the rear disk gangs 23 and 24 are held substantially in a given vertical position by loop members 29 which are connected to the inner ends of the disk gangs and are looped around forwardly diverging brace bars 30 which connect the front and rear transverse frame members 19 and 20. The loop members 29 are provided with a series of openings 31 through which suitable bolts 32 may be passed to hold the rear disk gangs in any vertical adjusted position. It is to be noted also that the inner ends of the rear gangs are raised and lowered about the pivots at eye members 26. It is seen, therefore, that universal movement of the rear gangs is had about the connection at eye members 26 and that such movement is also positively limited in all directions. Brace bars 33 connect the side portions 21 and 22 of the rear frame with the depending portions 25 thereof.

It has been found by experience that there must be a great deal of flexibility between the front and rear units of a double disk harrow in order that the harrow may be properly turned without sluing the rear unit and cramping and twisting the frame out of shape.

To make double disk harrows flexible to the desired degree, I have connected the front and rear units in a novel manner by rearwardly converging draft bars or links 34 and 35, one of the links 34 being vertically pivotally connected to the front gang frame 15 at the point 36 adjacent the vertical pivotal axis of the gang 13, and the other draft link 35 being vertically pivotally connected to the right front draft gang frame 16 at the point 37 adjacent its vertical pivot. These bars or links 34 and 35 converge rearwardly and are on opposite sides of the longitudinal center or median line of the harrow. The rear end of the draft link 34 is slidably or telescopically mounted with respect to the rear unit and passes through an elongated loop member 38 connected to the rear frame member 19. Similarly, the rear end of the other draft link member 35 is slidably or telescopically connected to the rear frame member and passes through an elongated loop member 39, also connected to the rear frame member 19. By referring to Fig. 3, it will be seen that each of the draft links includes two parts, the lower part having the front vertical pivotal portion which is pivoted to the front gang frame, said part extending rearwardly and about midway of its length having an upturned stop portion 40, the bar then extending rearwardly parallel to the main lower portion of the bar and passing through the loop member secured to the rear transverse frame member 19. The other portion of each of the draft bars has its front end 41 turned down and secured to the lower portion and extends parallel with and is connected to the lower portion by any suitable means, thereby forming guideways 42 through which the front portion of the rear harrow frame may slide, especially when the harrow is making a turn. Normally, as shown in Fig. 1, the stop portions 40 of the draft bars are in engagement with the front corner draft portions 43 formed by the bends in the transverse frame member 20 for causing the rear unit to travel in a guided manner forwardly with the front unit when said front unit is moved forwardly. As is well known, the real test of flexibility occurs when the double disk harrow is making a turn. In many double disk harrows in making the turn the rear unit is slued around, which is not only undesirable from the standpoint of work, but strains the frame of the machine very seriously and many times permanently twists the frame. With my draft connection a great degree of flexibility is obtained. In making a short turn to the right, as shown in Fig. 2, the rear unit will be drawn entirely by the left hand draft link 34, while the other draft link 35 will telescope or slide rearwardly through the loop member 39. It will thus be seen that each draft member is capable of acting independently of the other during the turning movements of the harrow. It will be observed also that when making a short turn to the right, the stop member 40 on the link 34 will move to the left along the inside portion of the rear frame member 21. However, under normal operating conditions, the harrow will seldom be turned so short that this stop member will be moved out of its corner 43 of the rear frame. In any event, when the harrow turns into the straightaway path, the draft members immediately center themselves and divide the load, or, in other words, the stop members on the draft links 34 and 35 immediately move into the draft corners 43 of the rear frame, and, as a matter of fact, they are guided into such position by means of the angle of the portions 21 and 22 of the rear frame. It will be noted also that when the harrow is turned to the right to a considerable extent, as shown in Fig. 2, the stop member 40 on the right draft link 35 engages the rear frame member 19 adjacent the loop 39 to assist in turning the rear harrow unit accordingly. In a like manner, when the harrow is turned to the left to a considerable extent, the other stop member 40 on the left draft link 34 will engage the rear frame member 19 adjacent the other loop member 38 for a similar purpose. These stop members also limit a rearward movement of the front gangs to prevent contact between the front and rear disks, which otherwise might prove disastrous.

It will be noted that the left hand draft member 34 forms a chord of an arc of a circle struck from the point 37 of pivotal connection between the front end of the other draft link 35 with the right front gang frame 16, and that the right draft link 35 forms a chord of an arc of a circle struck from the point 36 of pivotal connection between the front end of the left draft link 34 with the left front gang frame 15.

This specific arrangement of the rearwardly converging draft bars 34 and 35 makes possible a draft connection between the front and rear harrow units which operates with a great degree of exactness and at the same time gives a great degree of flexibility. At this point also attention is called to the fact that the loop members 28 and 29, shown in detail in Fig. 4, are elongated so that the rear ends of the draft links 34 and 35 may have a considerable rising movement to increase the flexibility of the connection. The necessity of the elongated loop members 38 and 39 becomes apparent when the harrow is given a short turn while moving along a slope.

Another desirable and, as a matter of fact, necessary requirement for the successful operation of double disk harrows is that the rear disks properly trail the front disks in a manner to level the ridges which are made by the front disks. This is accomplished by means of the draft connection which I have provided. In other words, by means of this draft connection, the rear harrow unit is prevented from swaying to the right or left as it is being drawn forwardly. It trails and properly tracks the front disks in taking a curved path, as well as when taking a straight line movement. The two very desirable features, therefore, flexibility and proper trailing of the rear harrow for the purpose stated, are accomplished by means of the draft connection which I have provided between the front and rear units. It will be noted, by referring to Fig. 3, that the rear unit is prevented from tilting forwardly for the reason that the front portion of the rear harrow frame is located in the guideway formed by the upper and lower portions of the draft links.

A modification of the invention is shown in Figs. 8, 9, 10 and 11, wherein each of the draft bars 50 has a main portion 51 and an L portion 52 having its front end secured to the side of the former and having its rear portion connected to the main portion 51 by a strap 53 having a rearwardly extending portion 54 with notches 55 formed in opposite sides thereof. Adjustably mounted on the strap member 53 is a U-shaped member 56 having at its rear ends inwardly extending portions adapted to engage the various notches 55 in the strap 54, whereby the U-shaped member may be held in any adjusted position when the bolt 57, which passes through elongated slots in the U-shaped member and also through the strap, is drawn up. The front or rounded portion of each U-shaped member 56 engages its corresponding draft corner 43' of the rear harrow frame for draft purposes. By means of this arrangement, it is apparent that if there is any slight irregularity in the manufacture of the rear harrow frame, the same may be compensated for by adjusting the members 56 on the straps 53 to equalize the draft during a straight forward movement of the harrow.

It is evident that there may be various modifications of my invention as herein particularly shown and described, and it is my intention to cover all such modifications which do not involve a departure from the scope of my invention as set forth in the following claims.

What I claim as new is:

1. In a double harrow, front and rear units, and independently and telescopcially mounted rearwardly converging draft members, connecting said units.

2. In a double harrow, front and rear units, and independently and telescopically mounted draft members connecting said units, the points of connection between said draft members with front and rear units relative to the median line of the harrow being different.

3. In a double harrow, front and rear units, independently mounted converging draft members connecting said units, and means allowing either member to telescope with one of said units during turning movement of the harrow.

4. In a double harrow, front and rear units, independently mounted converging draft members connecting said units, and means allowing either member to telescope with the rear unit during turning movement of the harrow.

5. In a double harrow, front and rear units, and converging draft members between said units which are pivotally connected to one of said units, and means allowing either member to telescope with the other during turning movement of the harrow.

6. In a double harrow, front and rear units, converging draft members between said units which are pivotally connected to the front unit, and means allowing either member to telescope with the rear unit during turning movement of the harrow.

7. In a ground treating implement, front and rear units, independently acting rigid converging draft members connecting said units, means associated with said draft members for permitting both draft members to operate during the forward movement of the implement and one alone operating as a draft member during the turning movement of the implement.

8. In a ground treating implement, front and rear units, independently acting rigid converging draft members connecting said units, means associated with said draft members for permitting both draft members to operate during the forward movement of the implement and that member alone opposite the side toward which the implement is turned operating as a draft member during the turning movement of the implement.

9. A double harrow, comprising front and rear units, independently mounted converging draft members forming a connection between said units and having a relative sliding connection with respect to one of said units, and means whereby said members assume a given position when both units are moved in a straight line.

10. A double harrow, comprising front and rear units, independently mounted and rearwardly converging draft members located upon opposite sides of the longitudinal center of the harrow connecting said units and having sliding connection with respect to one of said units.

11. In a ground treating implement, front and rear frames, ground treating tools carried by said frames, an elongated loop member secured to one of said frames, and a draft connection between said front and rear frames and extending through and having a longitudinal movement in said elongated loop member to form a flexible connection between said front and rear frames.

12. In a ground treating implement, front and rear frames, ground treating tools carried by said frames, an elongated loop member secured to said rear frame, and a draft member connecting the front and rear frames and being slidably mounted through and having a longitudinal movement in said elongated loop member to form a flexible connection between said front and rear frames.

13. In a ground treating implement, front and rear frames, ground treating tools carried by said frames, loop members secured to said rear frame, and rearwardly converging draft members forming a connection between said front and rear frames and being slidably mounted through said loop members.

14. In a ground treating implement, front and rear frames, ground treating tools carried by said frames, elongated loop members secured to said rear frame, and rearwardly converging draft members forming a flexible connection between said front and rear frames and being slidably mounted through said loop members.

15. In a ground treating implement, front and rear frames, ground treating tools carried thereby, loop members carried by one of said frames, draft members connecting said front and rear frames and longitudinally slidable through and vertically movable in said loop members, and means to prevent tilting of the rear frame.

16. In a ground treating implement, front and rear frames, ground treating tools carried thereby, loop members carried by one of said frames, draft members connecting said front and rear frames and longitudinally slidable through and vertically movable in said loop members, and means associated with the draft members to prevent tilting of the rear frame.

17. In combination, front and rear units including earth working tools, draft connections including converging draft members connecting the two units, said draft members hingedly mounted on one unit and having a forward and backward movement relative to said other unit, and means for limiting said forward and backward movement.

18. In combination, front and rear units including earth working tools, draft connections including converging draft members connecting the two units, said draft members hingedly mounted on the front unit and having a forward and backward movement relative to said rear unit, and means for limiting said forward and backward movement.

19. In a double harrow, a front unit and a rear unit, and converging flexible connections between the units equally spaced on each side the central line, said connections being adapted to slide at one end.

20. In a ground treating implement, front and rear frames, ground treating tools carried thereby, and a draft connection between said frames, said draft connection having straight spaced members for slidably receiving one of said frames.

21. In a ground treating implement, front and rear frames, ground treating tools carried thereby, and a draft connection between said frames, said draft connection having spaced members for slidably receiving the rear frame.

22. In a ground treating implement, front and rear frames, ground treating tools carried thereby, and a draft connection between said frames, said draft connection having vertically spaced members, one of said members having a stop portion to limit relative movements between said frames.

23. In a double harrow, front and rear units, and rearwardly converging draft bars connecting said units, pivotally connected to one unit and slidably connected to the other unit, one of said draft bars being on a chord of an arc struck from the pivotal connection of the other draft bar with the front unit.

24. In a ground treating implement, front and rear frames, ground treating tools carried thereby, draft bars connecting said frames, and means on said draft bars whereby the relative longitudinal position of said draft bars with respect to the rear frame may be adjusted.

25. In a double harrow, front and rear units, draft bars connecting said units, and adjustable means on the draft bars for equalizing the draft effort exerted through said draft bars.

26. In a double harrow, front and rear units, draft bars connecting said units, and means on said draft bars for equalizing the draft effort exerted through said draft bars.

27. In a double harrow, front and rear frames, a gang of ground treating members having a universal connection with one of said frames, and means other than the universal connection for limiting movement of said gang relative to said frame.

28. In a harrow, a frame having depending portions, gangs of ground treating members each including a single disk shaft pivotally connected to the depending portions whereby the gangs may tilt in different directions, and means other than said depending portions to restrict the tilting movement of said gangs within certain limits.

29. In combination, front and rear frames, earth working tools carried thereby, one of said frames including a member having converging sides and a portion between said sides at right angles to the line of draft, draft elements connecting said frames and pulling forwardly and outwardly from the corners formed between the converging sides and said other portion.

30. In combination, front and rear frames, earth working tools carried thereby, one of said frames including a member having converging sides and a portion between said sides at right angles to the line of draft, draft elements connecting said frames and pulling forwardly and outwardy from the corners formed between the converging sides and said other portion and slidably connected thereto.

31. In combination, front and rear frames, earth working tools carried thereby, one of said frames including a member having converging sides and a portion between said sides at right angles to the line of draft, draft elements connecting said frames and pulling forwardly and outwardly from the corners formed between the converging sides and said other portion, and slidably connected thereto, said draft elements converging toward the center line of draft.

32. In combination, front and rear frames, earth working tools carried thereby, independently slidable draft elements connecting said frames and converging toward the line of draft.

33. In combination, front and rear groups of earth working tools, and telescopically related frame elements connecting said front and rear groups including converging draft means pivotally mounted at one end.

34. In combination, front and rear groups of earth working tools, and telescopically related frame elements connecting said front and rear groups including converging draft means flexibly connected at one end.

35. In combination, front and rear groups of earth working tools, and telescopically related frame elements connecting said front and rear groups including rearwardly converging draft means pivotally mounted at one end.

36. In an attachment for an implement, a group of ground treating tools and frame members connected to said group including telescopically related elements, two of which form converging draft members.

37. In a double disk harrow, front and rear harrow frames, disk gangs carried thereby, and converging coupling elements, flexibly connected to one frame and slidably connected to the other so as to permit longitudinal movement and limited vertical movement in said last mentioned frame.

38. In a double disk harrow, front and rear harrow frames, disk gangs carried thereby, and converging coupling elements pivotally connected to one frame and slidably connected to the other.

39. In a double disk harrow, front and rear harrow frames, disk gangs carried thereby, and converging rigid coupling elements pivotally connected to one frame and slidably connected to the other.

40. In a double disk harrow, front and rear harrow frames, harrow units carried thereby, coupling elements pivotally connected to the front frame at points equally distant on each side of the line of draft, the rear frame including members forming corners at less distance from the line of draft than the forward pivotal points, the coupling elements engaging the rear frame at said corners.

41. In a double disk harrow, front and rear harrow frames, harrow units carried thereby, coupling elements pivotally connected to the front frame at points equally distant on each side of the line of draft, the rear frame including members forming corners at less distance from the line of draft than the forward pivotal points, the coupling elements slidably engaging the rear frame at said corners.

42. In a double disk harrow, front and rear harrow frames, harrow units carried thereby, coupling elements pivotally connected to the front frame at points equally distant on each side of the line of draft, the rear frame including members forming corners at less distance from the line of draft than the forward pivotal points, the coupling elements slidably engaging the rear frame at said corners, and means for preventing tilting of the rear frame.

43. In a double disk harrow, front and rear harrow frames, harrow units carried thereby, coupling elements pivotally connected to the front frame at points equally distant on each side of the line of draft, the rear frame including members forming corners at less distance from the line of draft than the forward pivotal points, the coupling elements slidably engaging the rear frame at said corners, and means connected with the coupling elements for preventing tilting of the rear frame.

In testimony whereof I affix my signature.

CHARLES S. SHARP.